US012759617B2

(12) United States Patent
Heo

(10) Patent No.: US 12,759,617 B2
(45) Date of Patent: Oct. 13, 2026

(54) STEERING ACTUATOR AND INITIAL FREE PLAY ADJUSTMENT METHOD BETWEEN REDUCER GEARS OF STEERING ACTUATOR

(71) Applicant: HL MANDO CORPORATION, Gyeonggi-do (KR)

(72) Inventor: Seongmoo Heo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 624 days.

(21) Appl. No.: 18/211,186

(22) Filed: Jun. 16, 2023

(65) Prior Publication Data

US 2023/0406403 A1 Dec. 21, 2023

(30) Foreign Application Priority Data

Jun. 17, 2022 (KR) ........................ 10-2022-0074296

(51) Int. Cl.
*B62D 5/04* (2006.01)
*B62D 7/16* (2006.01)
(Continued)

(52) U.S. Cl.
CPC ............. *B62D 5/0421* (2013.01); *B62D 7/16* (2013.01); *F16H 37/122* (2013.01);
(Continued)

(58) Field of Classification Search
CPC ........ B62D 5/0421; B62D 7/16; B62D 5/001; B62D 5/0403; B60Y 2410/10;
(Continued)

(56) References Cited

U.S. PATENT DOCUMENTS 1,541,499 A * 6/1925 Hinnekens ............ F16H 57/039 184/6.12
5,757,179 A * 5/1998 McCurley .............. G01D 5/145 324/207.2
(Continued)

FOREIGN PATENT DOCUMENTS

KR 10-1364930 2/2014
KR 10-2167914 10/2020

*Primary Examiner* — Timothy Wilhelm
(74) *Attorney, Agent, or Firm* — WOMBLE BOND DICKINSON (US) LLP

(57) ABSTRACT

Disclosed herein is a steer-by-wire type steering actuator. In accordance with one aspect of the present disclosure, a steering actuator may include: a first reducer including a worm configured to rotate by receiving a rotational force of a motor and a worm wheel configured to rotate in engagement with the worm; a pinion shaft coupled to a center of the worm wheel and configured to rotate together with the worm wheel; a second reducer including a first gear formed on the pinion shaft, and an output shaft configured to operate a pitman arm while rotating by receiving a rotational force through a second gear engaged with the first gear; a first gear housing configured to receive the worm and coupled to the motor; a second gear housing provided with a first mounter for receiving and mounting the pinion shaft and a second mounter formed apart to communicate with the first mounter and configured to receive and mount the output shaft, and coupled to the first gear housing; and a holder configured to rotatably support the pinion shaft and having a rotational center axis eccentric with respect to a central axis of the pinion shaft to adjust an axial distance between the pinion shaft and the output shaft.

18 Claims, 12 Drawing Sheets

1000

(51) Int. Cl.

| | |
|---|---|
| ***F16H 37/12*** | (2006.01) |
| ***F16H 57/02*** | (2012.01) |
| ***F16H 57/021*** | (2012.01) |
| ***F16H 57/023*** | (2012.01) |
| ***F16H 57/039*** | (2012.01) |
| ***F16H 57/12*** | (2006.01) |

(52) U.S. Cl.

CPC ......... *F16H 57/021* (2013.01); *F16H 57/023* (2013.01); *F16H 57/039* (2013.01); *F16H 57/12* (2013.01); *F16H 2057/02034* (2013.01); *F16H 2057/02082* (2013.01); *F16H 2057/125* (2013.01)

(58) Field of Classification Search

CPC ........ B60Y 2410/102; B60Y 2400/702; F16H 37/122; F16H 57/021; F16H 57/023; F16H 57/039; F16H 57/12; F16H 2057/02034; F16H 2057/02082; F16H 2057/125; F16H 37/04; F16H 19/001; F16H 57/022; F16H 2057/0224; F16H 57/02; F16H 2057/02021

See application file for complete search history.

(56) References Cited

U.S. PATENT DOCUMENTS 6,761,244 B2 * 7/2004 Sano .................... B62D 5/0409 180/444
6,844,541 B2 * 1/2005 Alsobrooks .............. G01D 5/04 250/239
6,862,926 B2 * 3/2005 Mukaiyama ........... G01D 5/165 73/114.26
7,147,496 B2 * 12/2006 Kuerschner ........... B60R 16/027 439/15
7,159,688 B2 * 1/2007 Onizuka ................ H02K 11/24 180/444
7,217,106 B2 * 5/2007 Tanaka .................. F16C 27/066 180/443
7,350,617 B2 * 4/2008 Lausser .................... B62D 6/10 180/444
7,357,216 B2 * 4/2008 Ishii ....................... B62D 3/126 74/427
7,523,805 B2 * 4/2009 Imagaki ............... B62D 5/0409 180/443
7,726,208 B2 * 6/2010 Hoeller .................... B62D 6/10 73/862.331
7,748,492 B2 * 7/2010 Iwasa ...................... F16C 27/04 180/444
8,528,436 B2 * 9/2013 Saito ........................ B62D 1/16 74/606 R
8,667,858 B2 * 3/2014 Fuechsel ............... F16C 35/045 384/535
8,689,926 B2 * 4/2014 Nagase ................ H02K 7/1166 180/443
8,701,503 B2 * 4/2014 Shimizu ................... B62D 6/10 73/862.333
8,727,065 B2 * 5/2014 Kuroumaru ............. F16H 55/24 180/443
8,833,507 B2 * 9/2014 Sekikawa ............... F16C 27/04 180/443
8,896,296 B2 * 11/2014 Hamaguchi .......... G01D 11/245 324/207.21
8,936,526 B2 * 1/2015 Boutouil ................. F16H 19/08 475/162
8,960,364 B2 * 2/2015 Ji ............................ F16H 19/04 180/443
9,168,947 B2 * 10/2015 Shiino .................. B62D 5/0409
9,403,554 B2 * 8/2016 Henning ............ B62D 15/0215
9,452,773 B2 * 9/2016 Sato ..................... B62D 5/0421
9,469,334 B2 * 10/2016 Ko ............................ F16H 1/32
9,505,431 B2 * 11/2016 Yoshida .................... G01L 3/10
9,533,703 B2 * 1/2017 Shimizu ................ F16D 41/064
9,540,041 B2 * 1/2017 Murakami ............... B62D 6/10
9,683,873 B2 * 6/2017 Lee ......................... B29C 45/00
9,707,992 B2 * 7/2017 Kiyota .................... F16H 55/06
9,988,073 B2 * 6/2018 Shiina ..................... F16D 11/00
10,370,028 B2 * 8/2019 Matsumura .......... B62D 5/0463
10,427,713 B2 * 10/2019 Kim .......................... B62D 5/06
10,661,822 B2 * 5/2020 Kawamura ............. F16C 27/06
10,718,637 B2 * 7/2020 Cai ...................... G01D 5/2053
10,739,215 B2 * 8/2020 Lee .......................... G01L 3/02
10,858,036 B2 * 12/2020 Fujita ................... B62D 5/0406
11,027,774 B2 * 6/2021 Yoda .................... B62D 5/0481
11,187,302 B2 * 11/2021 Griewenka ........... F16H 1/2863
11,273,867 B2 * 3/2022 Sovern ............... B62D 15/0215
11,407,441 B2 * 8/2022 Hafermalz ............ F16H 57/039
11,958,547 B2 * 4/2024 Ishihara ................... B62D 5/14
12,134,434 B2 * 11/2024 Scheer .................... G01L 3/105
2001/0040067 A1 * 11/2001 Murakami ............ F16F 1/3828 180/443
2007/0102228 A1 * 5/2007 Shiina ..................... F16C 25/08 180/444
2007/0209857 A1 * 9/2007 Wolf .................. B60N 2/02246 180/315
2013/0140105 A1 * 6/2013 Ji ......................... B62D 5/0403 74/30
2013/0180348 A1 * 7/2013 Andres ................. F16H 37/041 74/89.14
2014/0311263 A1 * 10/2014 Washnock ............... B62D 3/08 74/89.14
2015/0197277 A1 * 7/2015 Mehl ....................... F16C 23/10 180/444
2016/0214648 A1 * 7/2016 Schoepe ................. G01L 3/104
2018/0208057 A1 * 7/2018 Yoshimura ......... B60K 17/3505
2019/0207472 A1 * 7/2019 Uematsu .............. H02K 11/215
2019/0285140 A1 * 9/2019 Suzuki .................... F16H 1/203
2020/0208727 A1 * 7/2020 Segawa ..................... F16H 1/16
2022/0126912 A1 * 4/2022 Uchida .................... B62D 5/30
2022/0185364 A1 * 6/2022 Kwon .................. B62D 5/0406
2023/0399047 A1 * 12/2023 Sung .................... B62D 5/0454

* cited by examiner

STEERING ACTUATOR AND INITIAL FREE PLAY ADJUSTMENT METHOD BETWEEN REDUCER GEARS OF STEERING ACTUATOR

CROSS-REFERENCE TO RELATED APPLICATION

This application claims the benefit of Korean Patent Application No. 10-2022-0074296, filed on Jun. 17, 2022 in the Korean Intellectual Property Office, the disclosure of which is incorporated herein by reference.

BACKGROUND

1. Field

Embodiments of the present disclosure relate to a steer-by-wire type steering apparatus and, more particularly, to a steering actuator applied to a small vehicle and an initial free play adjustment method between reducer gears of the steering actuator.

2. Description of the Related Art

In general, power steering has been developed and applied to a steering apparatus of a vehicle in order to assist a driver's operating force for a steering wheel and thus to provide convenience of driving operation. In addition, types of power steering, which have been developed and applied, are classified into a hydraulic type using hydraulic pressure, an electro-hydraulic type using both hydraulic pressure and electric power of a motor, and an electric type using only the electric power of a motor.

Recently, a steer-by-wire (SBW) type steering apparatus has been developed and applied which steers a vehicle by using an electric motor such as a motor instead of removing a mechanical connection device such as a steering column or a universal joint between a steering wheel and wheels.

Such an SBW type steering apparatus is provided to steer wheels usually by outputting a rotational force of a motor as power to a pinion shaft through a worm and a worm wheel structure or to steer a vehicle through a pitman arm installed in an output shaft.

However, when an SBW type steering apparatus is mounted and used in a small vehicle or personal mobility, since an output shaft (pinion shaft) has a small driving range due to a product structure, a significant reduction ratio is required, and initial free play adjustment is also necessary for smooth engagement between reducer gears.

SUMMARY

Therefore, it is an aspect of the present disclosure to provide a steering actuator capable of providing a significant reduction ratio by having a two-stage reduction structure, and an initial free play adjustment method between reducer gears of the steering actuator.

It is another aspect of the present disclosure to provide a steering actuator capable of easily adjusting a backlash between reduction gears provided in a steering actuator and an initial free play adjustment method between reducer gears of the steering actuator.

Additional aspects of the disclosure will be set forth in part in the description which follows and, in part, will be obvious from the description, or may be learned by practice of the disclosure.

In accordance with one aspect of the present disclosure, a steering actuator includes: a first reducer including a worm configured to rotate by receiving a rotational force of a motor and a worm wheel configured to rotate in engagement with the worm; a pinion shaft coupled to a center of the worm wheel and configured to rotate together with the worm wheel; a second reducer including a first gear formed on the pinion shaft, and an output shaft configured to operate a pitman arm while rotating by receiving a rotational force through a second gear engaged with the first gear; a first gear housing configured to receive the worm and coupled to the motor; a second gear housing provided with a first mounter for receiving and mounting the pinion shaft and a second mounter formed apart to communicate with the first mounter and configured to receive and mount the output shaft, and coupled to the first gear housing; and a holder configured to rotatably support the pinion shaft and having a rotational center axis eccentric with respect to a central axis of the pinion shaft to adjust an axial distance between the pinion shaft and the output shaft.

The holder may further include an upper bearing coupled to the pinion shaft and assembled at an upper side of the holder and a lower bearing coupled to the pinion shaft and assembled at a lower side of the holder.

The holder may include an upper holder having an upper assembly groove in which the upper bearing is assembled and a lower holder having a lower assembly groove in which the lower bearing is assembled, and the upper assembly groove and the lower assembly groove may be formed in a row so as to have the same central axis as the pinion shaft.

A stopper configured to support an outer ring of the upper bearing and an outer ring of the lower bearing may be provided between the upper assembly groove and the lower assembly groove.

The lower holder may be formed to have a central axis eccentric with respect to the central axis of the pinion shaft so that a position of the central axis of the pinion shaft is changed according to rotation of the lower holder.

The steering actuator may further include a fixing device configured to restrict an axial movement of the pinion shaft and fix the upper bearing and the lower bearing to the holder.

The fixing device may include a wave washer disposed above the upper bearing, a lock ring disposed below the lower bearing and stacking-assembled with the pinion shaft to support an inner ring of the lower bearing, and a flange formed to extend from the pinion shaft in a radial direction and configured to apply a pressure to support an inner ring of the upper bearing through the wave washer.

The wave washer may be elastically deformed by being pressed by the flange and absorb tolerance.

The first mounter may have a seating jaw protruding upward to form a seating groove where the lower holder is seated, and the upper holder may be seated on an upper surface of the seating jaw and supported.

A plurality of coupling pieces, which are spaced a predetermined distance apart and protrude in a radial direction, may be provided at an edge of the upper holder.

The second gear housing may be provided with a free play adjustment protrusion with a fastening hole formed in a position corresponding each of the plurality of coupling pieces.

In the plurality of coupling pieces, a coupling hole may be formed so that a bolt passes through to be fastened to the fastening hole, and the coupling hole may be provided as a long hole with a predetermined length in a direction corresponding to a circumferential direction of the lower holder.

The upper holder may be bolted to the free play adjustment protrusion through the long hole and the fastening hole after a backlash between the first gear of the pinion shaft and the second gear of the output shaft is adjusted.

The first mounter of the second gear housing may have free play adjustment protrusions that are spaced a predetermined distance apart from each other and thus have a predetermined length, the first gear housing may have a free play adjustment groove, into which each of the free play adjustment protrusions is inserted, in a position corresponding to each of the free play adjustment protrusions, and the free play adjustment groove may have a greater length than the free play adjustment protrusion.

The free play adjustment protrusion and the free play adjustment groove may be formed to have a predetermined length in a direction where the worm and the worm wheel face each other, the first gear housing may be moved through the free play adjustment groove and the free play adjustment protrusion and fixed to the second gear housing by a bolt after backlash adjustment between the worm and the worm wheel.

The steering actuator may further include a fixing member configured to fix the output shaft to the second mounter.

The fixing member may have a first fixer assembled with an upper portion of the output shaft with respect to the second gear and rotatably supporting the output shaft and a second fixer assembled with a lower portion of the output shaft with respect to the second gear and rotatably supporting the output shaft.

The first fixer may include a needle bearing coupled to an upper end of the output shaft and a bearing cover having the needle bearing installed at a center and pressed-fitted to the second mounter.

The second fixer may include a fixed bearing having an inner ring supported on a stepped portion of the output shaft and an outer ring supported on a mounting hole of the second gear housing, a lock nut screwed to the output shaft to support the inner ring of the fixed bearing, a plug having an inner side receiving the lock nut and an outer side screwed to the mounting hole of the second gear housing, and a dust seal interposed between the inner side of the plug and the output shaft.

In accordance with another aspect of the present disclosure, an initial free play adjustment method between reducer gears of a steering actuator is provided, and the steering actuator may include: a pinion shaft installed at a center of a worm wheel engaged with a worm; an output shaft having a second gear engaged with a first gear formed on the pinion shaft; and a holder coupled to the pinion shaft and having a rotational center axis eccentric with respect to a central axis of the pinion shaft. The steering actuator may adjust a backlash between the first gear and the second gear by rotating the rotational center axis of the holder to change the central axis of the pinion shaft.

In accordance with still another aspect of the present disclosure, an initial free play adjustment method between reducer gears of a steering actuator is provided, and the steering actuator may include: a first gear housing configured to receive a worm and cover a worm wheel engaged with the worm; a second gear housing in which the worm wheel is disposed and mounted; a plurality of free play adjustment protrusions provided in the second gear housing to be located radially outside the worm wheel; and a free play adjustment groove provided in the first gear housing at a position corresponding to each of the free play adjustment protrusions so that each of the free play adjustment protrusions is inserted. The free play adjustment groove and the free play adjustment protrusion may have a predetermined length in a direction where the worm and the worm wheel face each other, and the free play adjustment groove may have a greater length than the free play adjustment protrusion. The steering actuator may adjust a backlash between the worm and the worm wheel by moving the first gear housing in a longitudinal direction of the free play adjustment protrusion and the free play adjustment groove.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings may omit the illustration of parts not related to the description in order to clarify the present invention, and slightly exaggerate the size of the components to help understanding.

Figure 1:
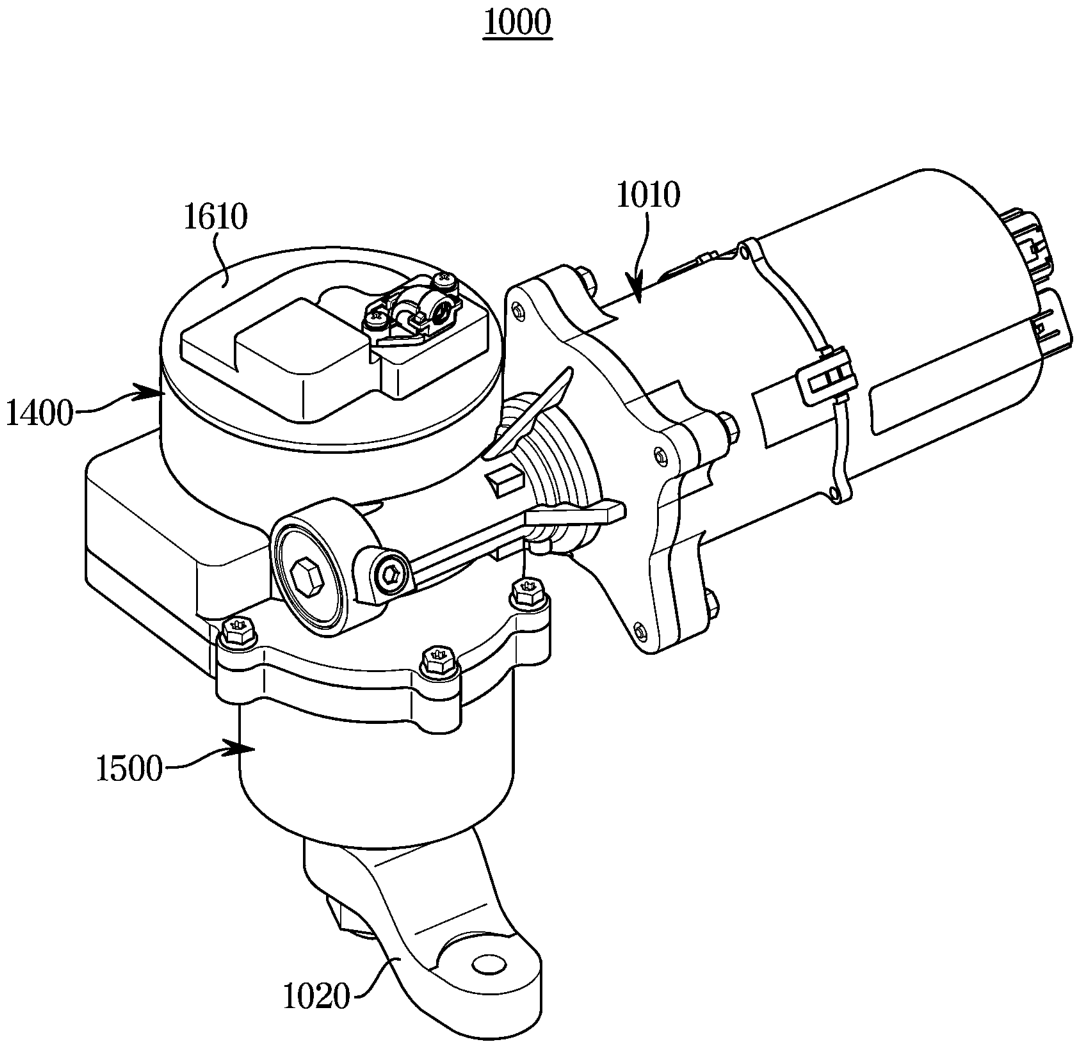
FIG. 1 is a perspective view illustrating a steering actuator in accordance with an embodiment of the present disclosure.
Figure 2:
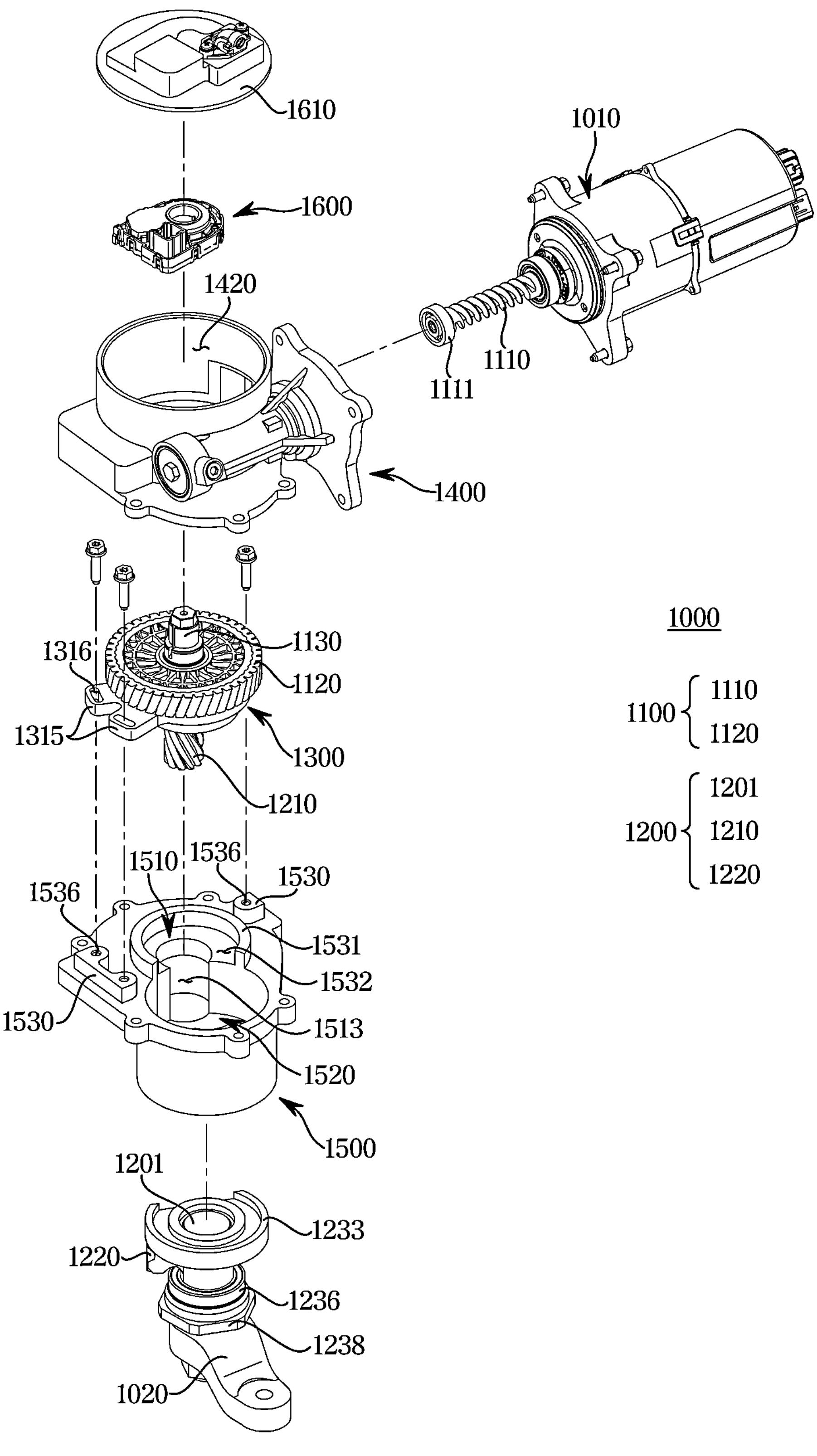
FIG. 2 is an exploded perspective view illustrating the steering actuator in accordance with the embodiment of the present disclosure.
Figure 3:
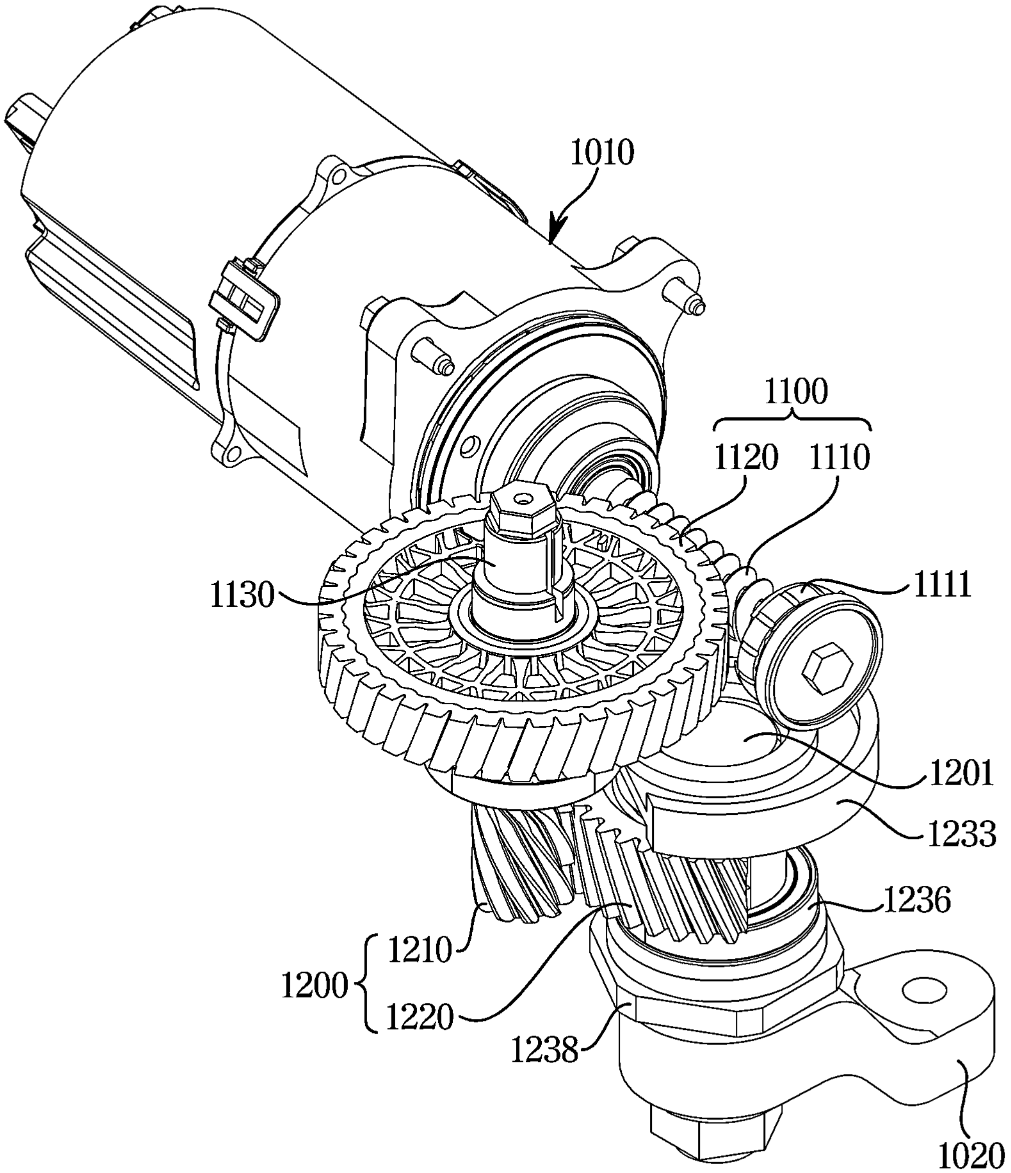
FIG. 3 is a perspective view illustrating a state in which reduction gear units of the steering actuator are engaged in accordance with the embodiment of the present disclosure.
Figure 4:
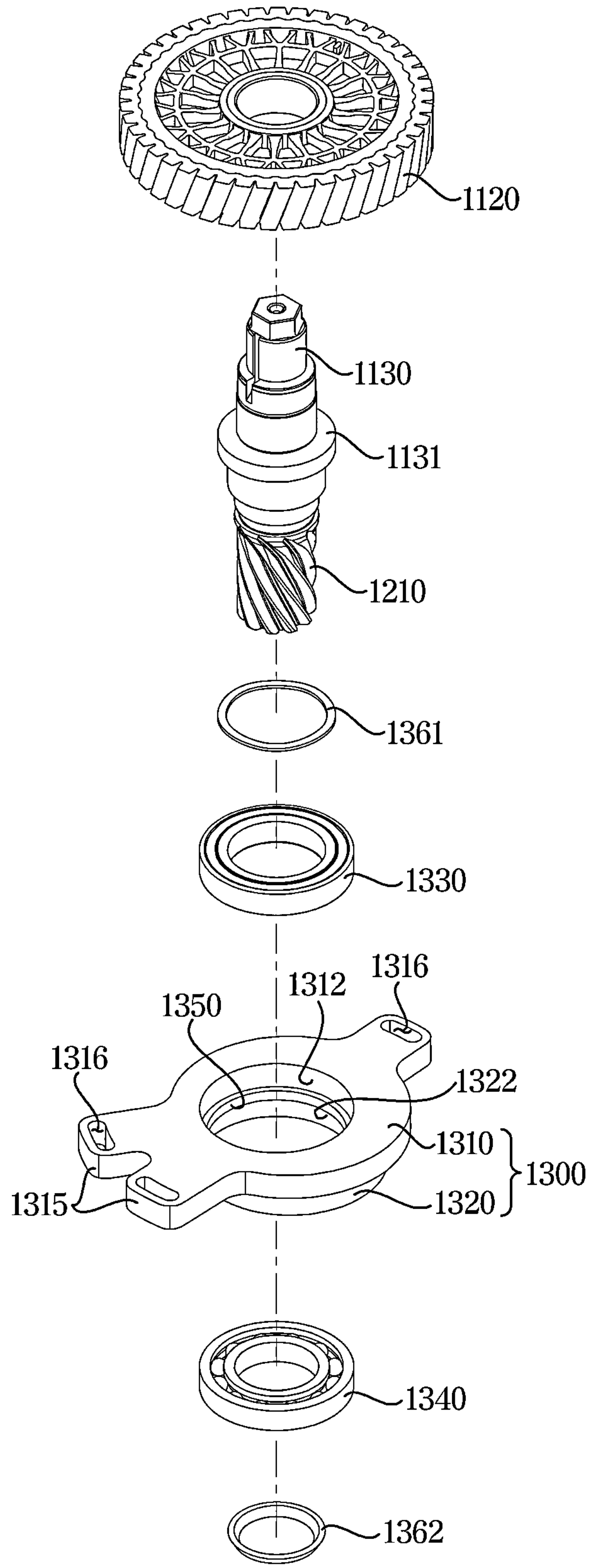
FIG. 4 is an exploded perspective view illustrating a state in which a first reducer and a holder of the steering actuator are assembled in accordance with the embodiment of the present disclosure.
Figure 5:
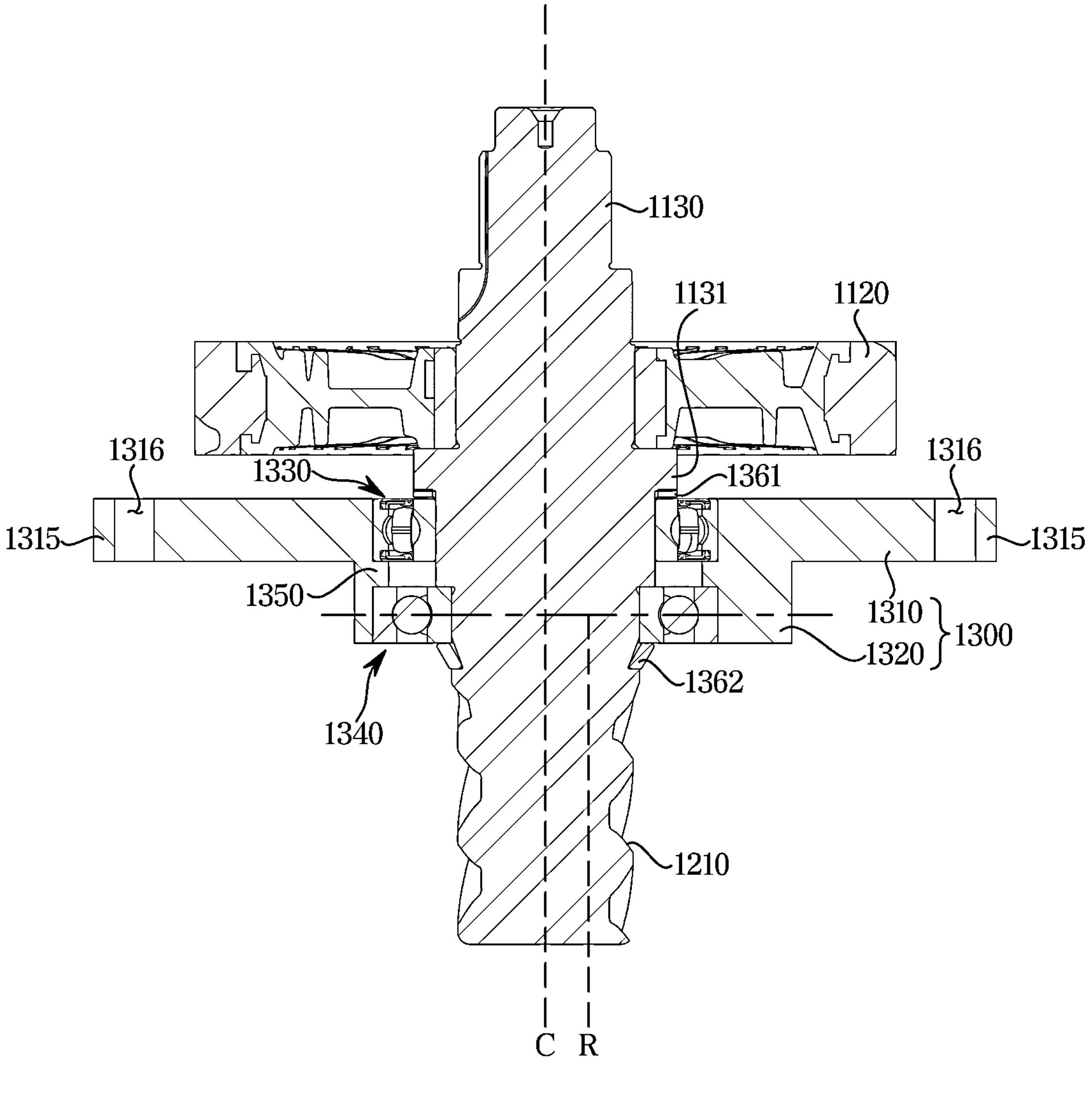
FIG. 5 is an assembled cross-sectional view of FIG. 4.
Figure 6:
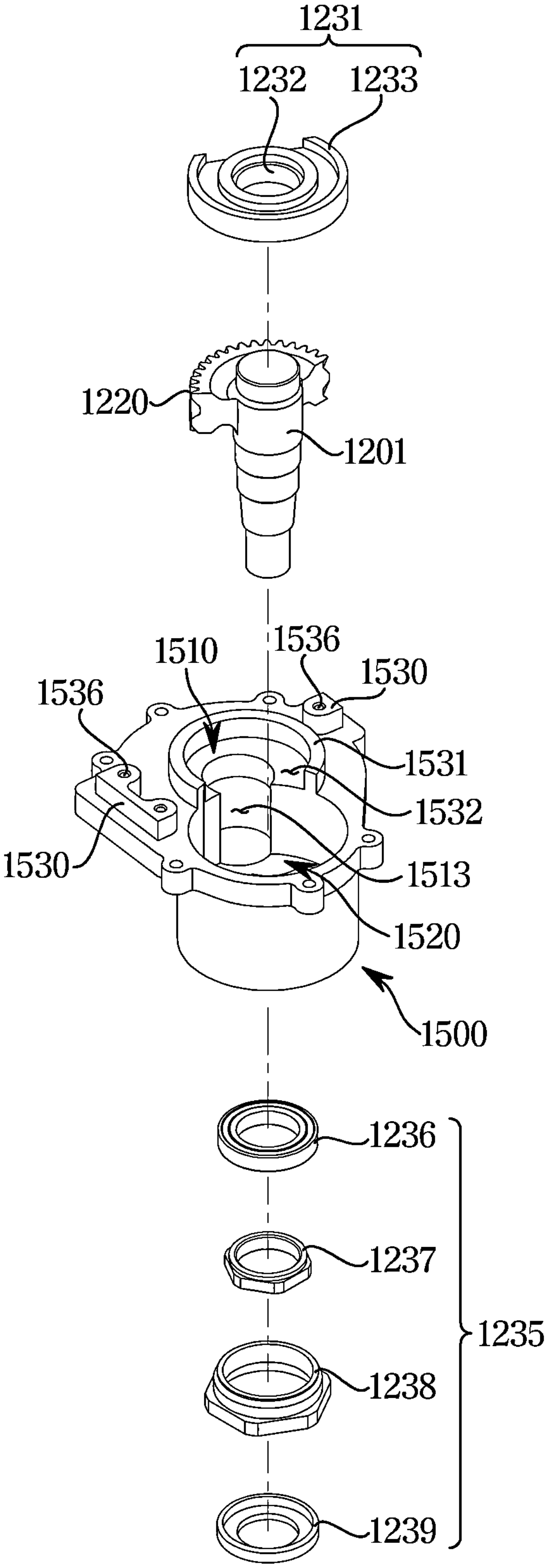
FIG. 6 is an exploded perspective view illustrating a state in which a second reducer and a fixed member of the steering actuator are assembled in accordance with an embodiment of the present disclosure.
Figure 7:
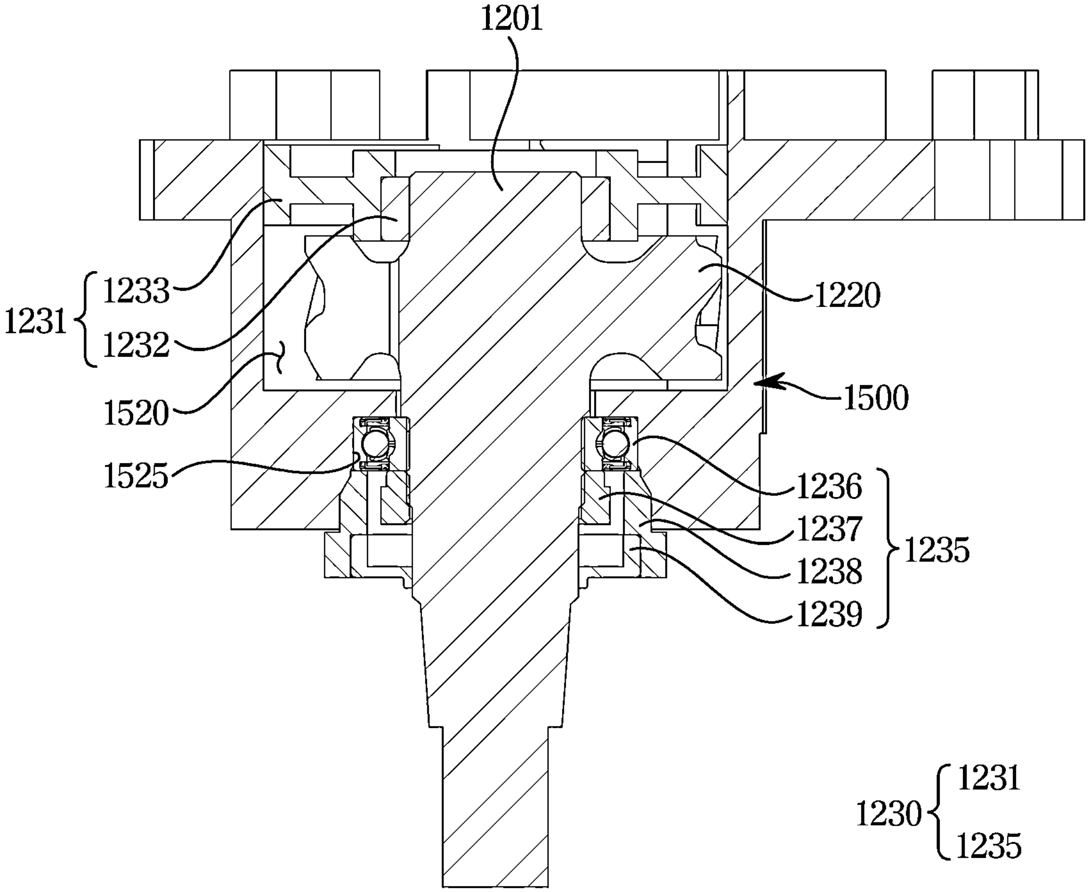
FIG. 7 is an assembled cross-sectional view of FIG. 6.
Figure 8:
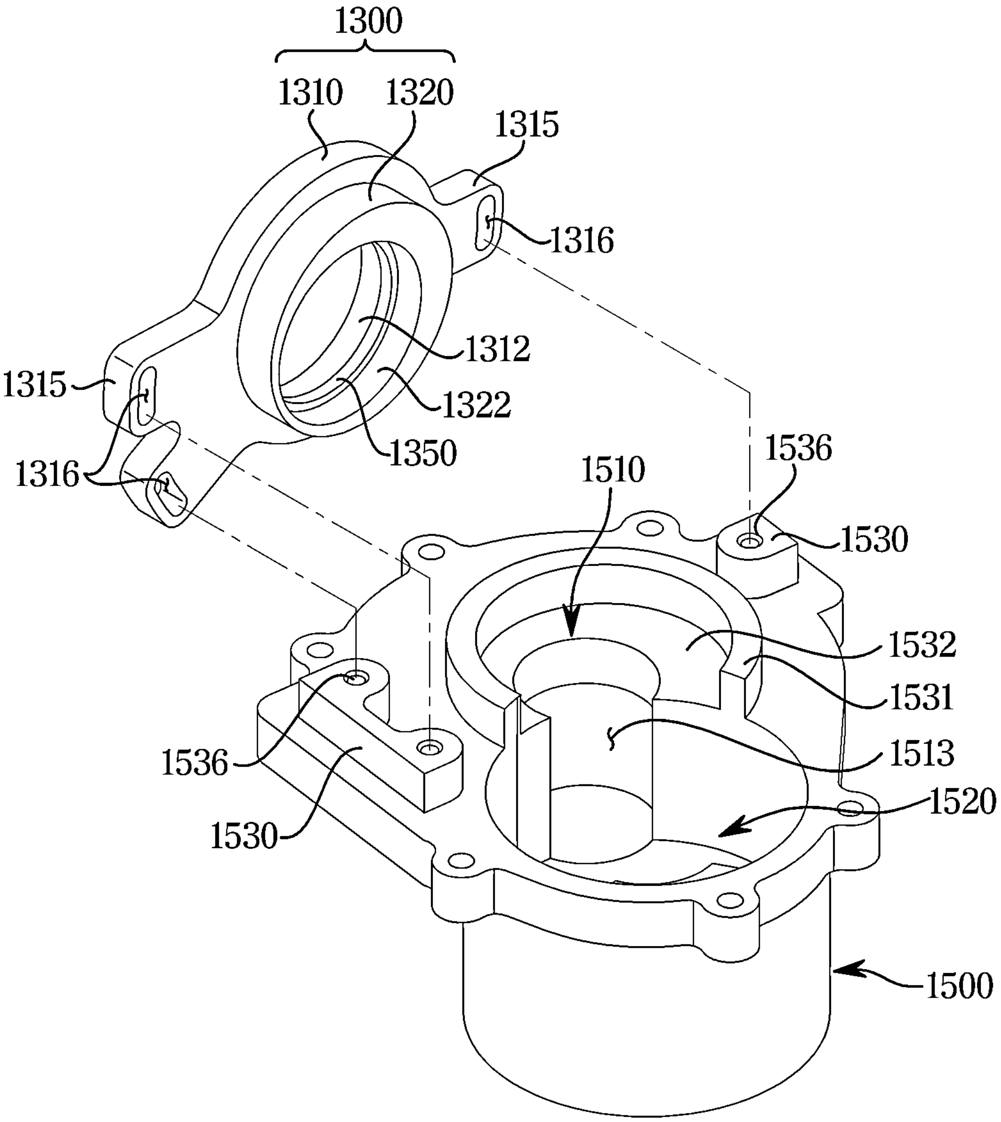
FIG. 8 is a view illustrating a state in which a holder and a second gear housing of the steering actuator are assembled in accordance with the embodiment of the present disclosure.
Figure 9:
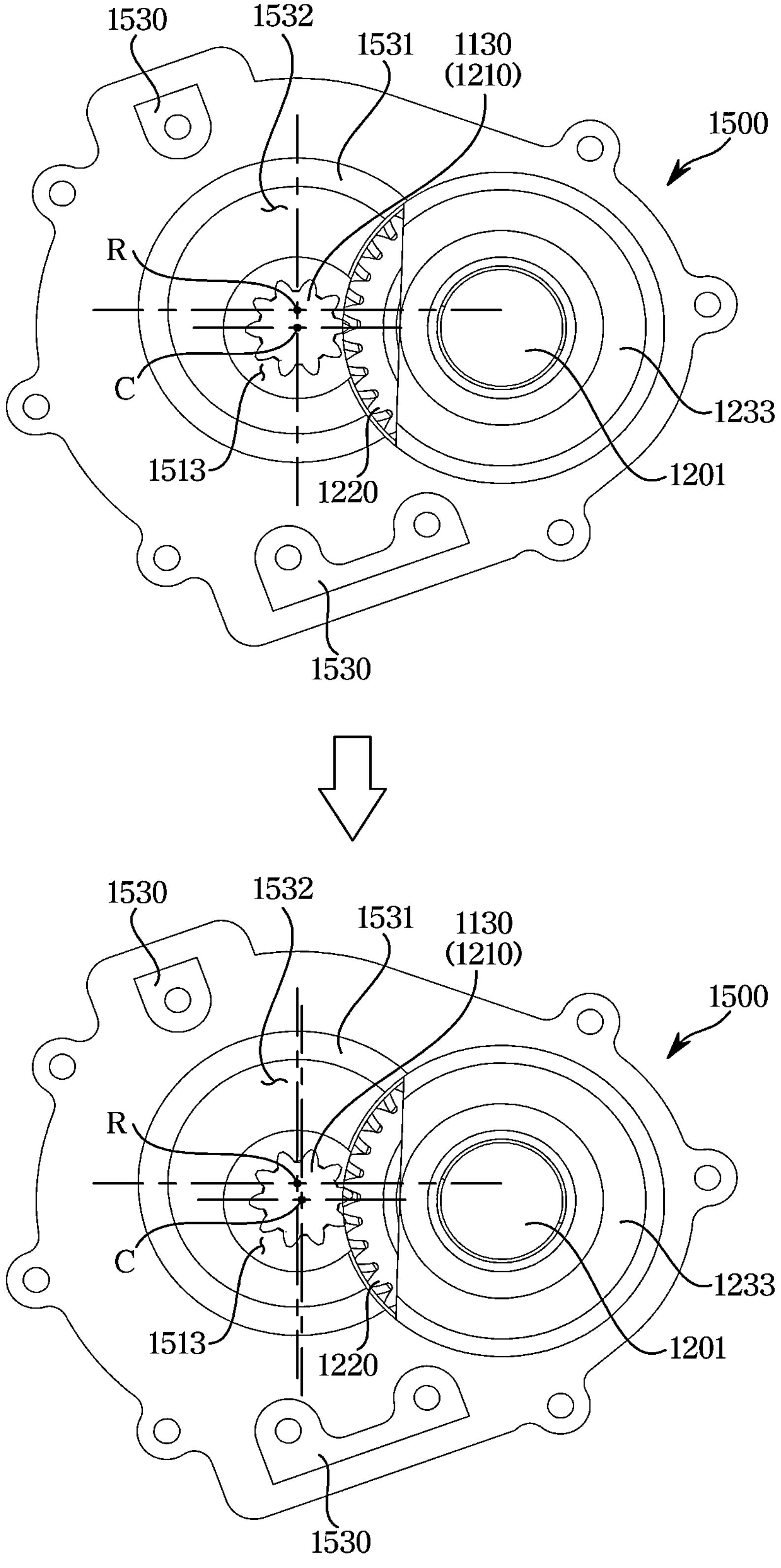
FIG. 9 is a view illustrating a state in which a central axis of a pinion shaft varies through the holder provided in the steering actuator in accordance with the embodiment of the present disclosure.
Figure 10:
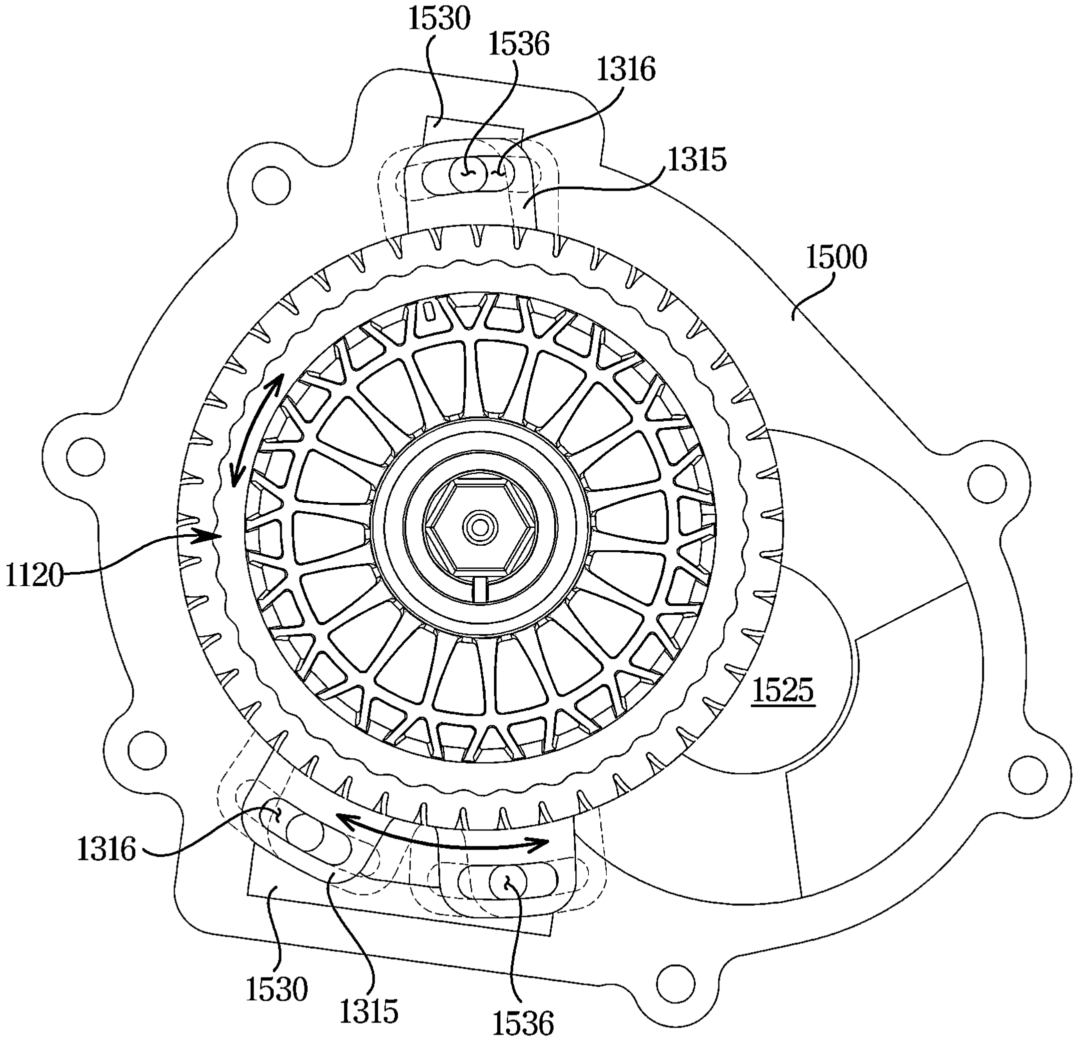
FIG. 10 is a plan view illustrating a state in which the holder provided in the steering actuator is rotated in accordance with the embodiment of the present disclosure.
Figure 11:
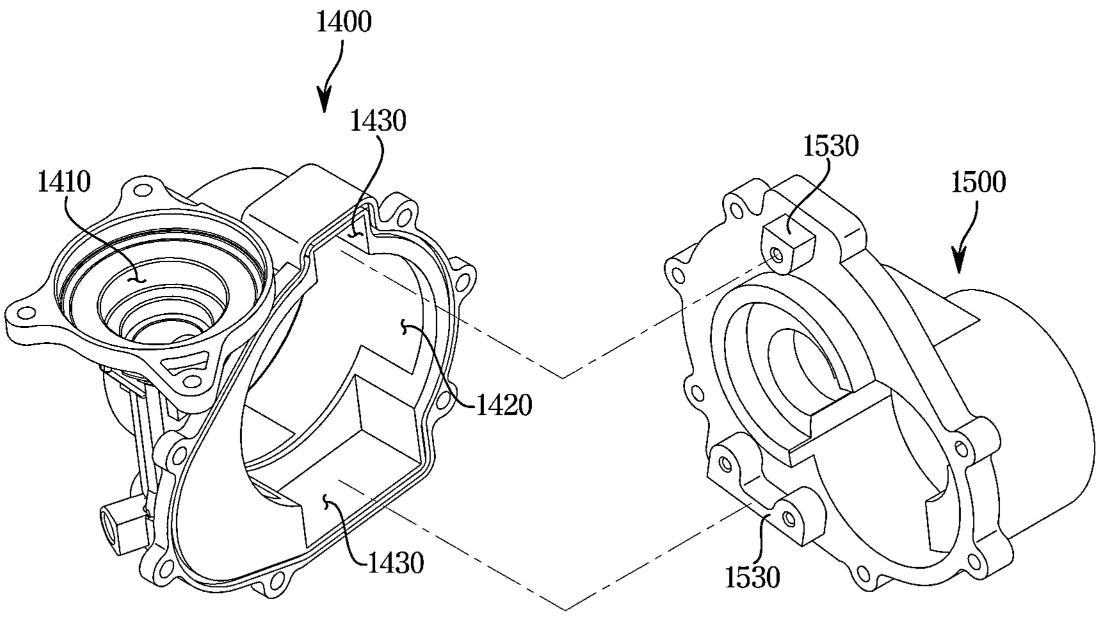
FIG. 11 is a view illustrating a state in which a first gear housing and a second gear housing are assembled in the steering actuator in accordance with the embodiment of the present disclosure.
Figure 12:
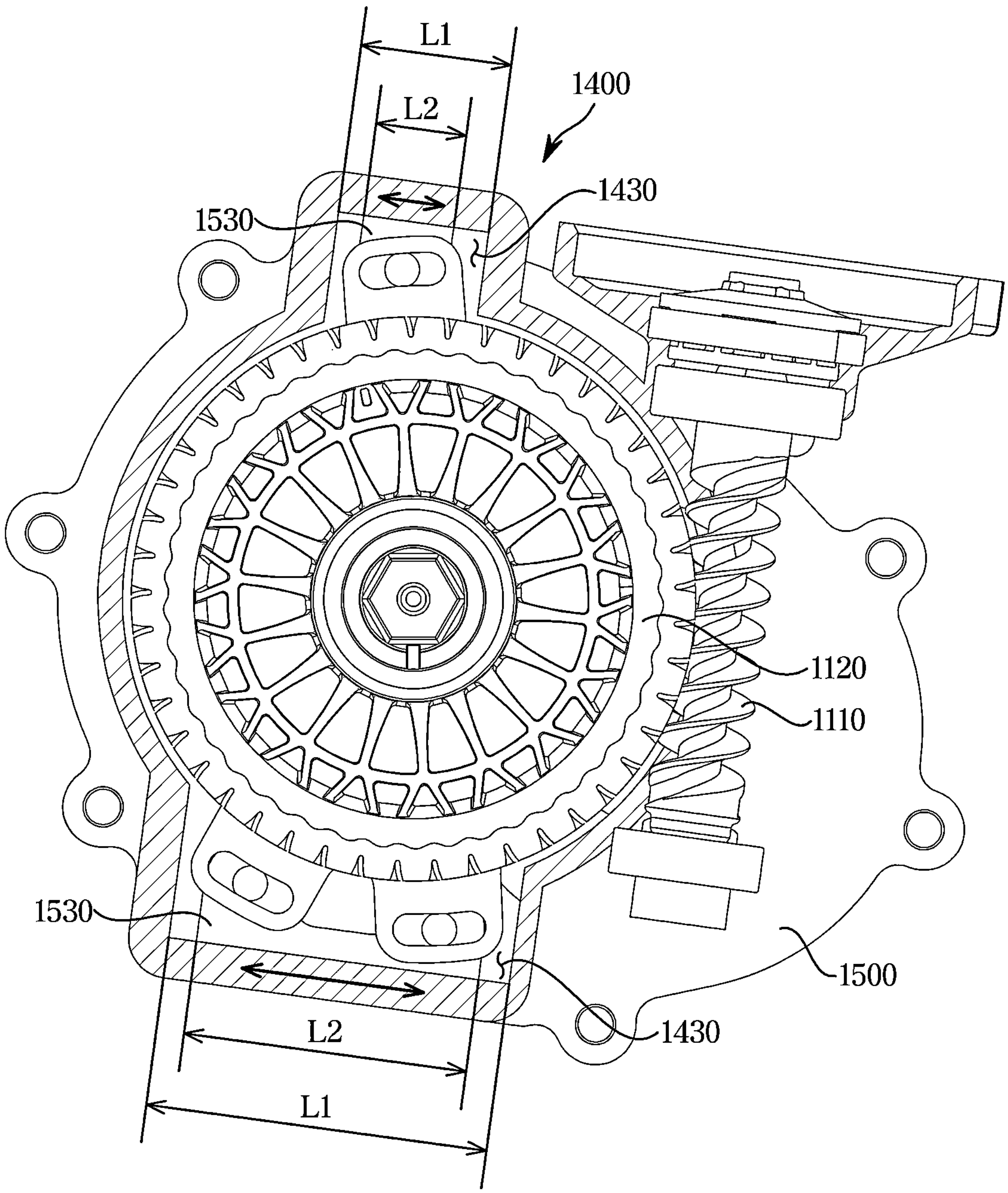
FIG. 12 is a view illustrating a state in which a backlash between a worm and a worm wheel is adjusted through a free play adjustment structure of the first gear housing and the second gear housing provided in the steering actuator in accordance with the embodiment of the present disclosure.

FIG. 1 is a perspective view illustrating a steering actuator in accordance with an embodiment of the present disclosure, FIG. 2 is an exploded perspective view illustrating the steering actuator in accordance with the embodiment of the present disclosure, FIG. 3 is a perspective view illustrating a state in which reduction gear units of the steering actuator are engaged in accordance with the embodiment of the present disclosure, FIG. 4 is an exploded perspective view illustrating a state in which a first reducer and a holder of the steering actuator are assembled in accordance with the embodiment of the present disclosure, FIG. 5 is an assembled cross-sectional view of FIG. 4, FIG. 6 is an exploded perspective view illustrating a state in which a second reducer and a fixed member of the steering actuator are assembled in accordance with the embodiment of the present disclosure. FIG. 7 is an assembled cross-sectional view of FIG. 6, FIG. 8 is a view illustrating a state in which a holder and a second gear housing of the steering actuator are assembled in accordance with the embodiment of the present disclosure, FIG. 9 is a view illustrating a state in which a central axis of a pinion shaft varies through the holder provided in the steering actuator in accordance with the embodiment of the present disclosure, FIG. 10 is a plan view illustrating a state in which the holder provided in the steering actuator is rotated in accordance with the embodiment of the present disclosure, FIG. 11 is a view illustrating a state in which a first gear housing and a second gear housing are assembled in the steering actuator in accordance with the embodiment of the present disclosure, and FIG. 12 is a view illustrating a state in which a backlash between a worm and a worm wheel is adjusted through a free play adjustment structure of the first gear housing and the second gear housing provided in the steering actuator in accordance with the embodiment of the present disclosure.

Referring to FIGS. 1 to 12, a steering actuator 1000 according to one aspect of the present disclosure may include a first reducer 1100 configured to rotate by receiving a rotational force of a motor 1010, a second reducer 1200 connected to the first reducer 1100, a first gear housing 1400 and a second gear housing 1500 configured to cover the reducers 1100 and 1200 to be mounted therein, a holder 1300 configured to adjust a backlash between gears of the second reducer 1200, and a free play adjustment means configured to adjust a backlash between gears of the first reducer 1100.

According to the present disclosure, the steering actuator 1000 may provide a significant reduction ratio by having a two-stage reduction structure and may be applied to and used in a small car or mobility.

The first reducer 1100 may be composed of a worm 1110 and a worm wheel 1120.

The worm 1110 may be configured to rotate by receiving a rotational force of the motor 1010. Although not illustrated, the worm 1110 may be coaxially connected to a rotation axis of the motor 1010 or may be connected directly to the motor 1010 in order to function as the rotation axis of the motor 1010. Herein, the worm 1110 is received into the first gear housing 1400 in a state of being rotatably supported. That is, the motor 1010 may be coupled and fixed to the first gear housing 1400 at a position where the worm 1110 is received, and a bearing 1111 supporting the worm 1110 may be installed at the opposite side.

The worm wheel 1120 may be engaged with the worm 1110 to rotate clockwise or counterclockwise according to a rotating direction of the worm 1110. Accordingly, the worm wheel 1120 may reduce power according to the rotation of the worm 1110 and transfer the power to the second reducer 1200 to be described below.

More specifically, a pinion shaft 1130 with a predetermined length may be coupled to the worm wheel 1120. The pinion shaft 1130 may be installed by passing through the center of the worm wheel 1120. Thus, the pinion shaft 1130 may be provided to rotate together with the worm wheel 1120. In addition, a first gear 1210 of the second reducer 1200 may be provided in the pinion shaft 1130 under the worm wheel 1120. Herein, the first gear 1210 is illustrated as being integrally formed with the pinion shaft 1130 by machining an outer surface of the pinion shaft 1130, but the present disclosure is not limited thereto, and a separate gear unit with the first gear 1210 may be coupled to the pinion shaft 1130.

In addition, a sensor 1600 may be provided on the pinion shaft 1130 above the worm wheel 1120. The sensor 1600 may be connected to the pinion shaft 1130 to be spaced a predetermined distance from and face the worm wheel 1120. The sensor 1600 may be provided as an angle sensor capable of measuring a rotation angle of the worm wheel 1120, which rotates according to the drive of the motor 1010, or a torque angle sensor capable of detecting torque and a rotation angle with a single sensor. The sensor 1600 may measure a rotation angle of the worm wheel 1120 and transmit the detected measurement value to an electronic control unit (not illustrated). Accordingly, by detecting a steering angle of a wheel according to the operation of a steering wheel, information may be provided to a driver or the steering angle may be adjusted. Since the sensor 1600 is a well-known technology, a detailed description thereof will be omitted.

Meanwhile, the reference numeral '1610' not described herein is a sensing cover that closes one side of an opened second receiver 1420 of the first gear housing 1400.

The second reducer 1200 may include the first gear 1210 formed on the pinion shaft 1130 and the output shaft 1201 that rotates by receiving a rotational force through the second gear 1220 engaged with the first gear 1210. Herein, the first gear 1210 and the second gear 1220 may be provided as pinion gears (spur gears) or helical gears. That is, the pinion shaft 1130 and the output shaft 1201 may have axes parallel to each other and receive power. The output shaft 1201 may be rotatably supported and fixed to the second gear housing 1500 by a fixing member 1230. That is, the output shaft 1201 may be received and mounted in a second mounter 1520 of the second gear housing 1500 and rotate by receiving a rotational force from the first gear 1210. Herein, since a pitman arm 1020 is coupled to a lower part of the output shaft 1201, the pitman arm 1020 may be operated according to rotation of the output shaft 1201. Since a link (not illustrated) connected to a tie rod or knuckle arm is coupled to an end of the pitman arm 1020, a wheel may be steered by rotation of the pitman arm 1020.

The fixing member 1230 may have a first fixer 1231 assembled with an upper portion of the output shaft 1201 with respect to the second gear 1220 to rotatably support the output shaft 1201 and a second fixer 1235 assembled with a lower portion of the output shaft 1201 with respect to the second gear 1220 to rotatably support the output shaft 1201.

The first fixer 1231 may include a needle bearing 1232 coupled to an upper end of the output shaft 1201 and a bearing cover 1233 having the needle bearing 1232 installed at the center and press-fitted to the second mounter 1520. Herein, the bearing cover 1233 may be formed to have a cutout surface. That is, the bearing cover 1233 may be formed to have a plane in a portion of a surface facing a first mounter 1510. Thus, when the output shaft 1201 is assembled with the second mounter 1520 by the fixing member 1230, interference with a component installed in the first mounter 1510 may be prevented.

The second fixer 1235 serves to support the output shaft 1201 to be rotatable at a lower part of the output shaft 1201. Specifically, the second fixer 1235 may include a fixed bearing 1236, a lock nut 1237 and a plug 1238 and may be mounted in a mounting hole 1525 that is formed in a lower part of the second mounter 1520.

The center of the fixed bearing 1236 may be coupled to the output shaft 1201, and an outer ring of the fixed bearing 1236 may be press-fit into the mounting hole 1525. Herein, the fixed bearing 1236 may be coupled so that an upper end of an inner ring is supported on a stepped portion of the output shaft 1201.

The lock nut 1237 is screwed to the output shaft 1201 in order to support the inner ring under the fixed bearing 1236. Accordingly, threads may be machined on an inner circumferential surface of the lock nut 1237 and an outer circumferential surface of the output shaft 1201 in a position where the lock nut 1237 is coupled.

The plug 1238 may be formed so that the center thereof is penetrated to receive the lock nut 1237 therein, and an outer side may be screwed and fixed to the mounting hole 1525. Herein, an upper end of the plug 1238 may be coupled to support the outer ring of the fixed bearing 1236 from the lower side. Accordingly, since the fixed bearing 1236 supports the output shaft 1201 while being rigidly fixed to the second gear housing 1500 and the needle bearing 1232 supports the output shaft 1201 at the upper end, the output shaft 1201 may smoothly rotate while being prevented from moving in an axial direction.

Meanwhile, at a lower end of the plug 1238, a dust seal 1239 may be interposed between an inner side of the plug 1238 and the output shaft 1201 in order to prevent foreign substances from entering the center of the plug 1238.

In accordance with one aspect of the present disclosure, the holder 1300 may be provided which rotatably supports the pinion shaft 1130 and restricts an axial movement. The holder 1300 may be provided not only to restrict the axial movement of the pinion shaft 1130 but also to adjust an axial distance between the pinion shaft 1130 and the output shaft 1201

More specifically, the holder 1300 may include an upper bearing 1330 and a lower bearing 1340, which are coupled to the pinion shaft 1130, an upper holder 1310 where the upper bearing 1330 is assembled, and a lower holder 1320 where the lower bearing 1340 is assembled.

An upper assembly groove 1312 may be formed in the upper holder 1310 so that the upper bearing 1330 is assembled at the upper side. The upper holder 1310 may be bolted to the first mounter 1510 of the second gear housing 1500. As illustrated, a plurality of coupling pieces 1315, which are spaced a predetermined distance apart and protrude in a radial direction, may be provided at an edge of the upper holder 1310. That is, the plurality of coupling pieces 1315 may be formed at regular intervals along the edge of the upper holder 1310. In the coupling pieces 1315, a coupling hole 1316 is formed which a bolt passes through to fix the holder 1300 to the second gear housing 1500. Herein, the coupling hole 1316 may be a long hole with a predetermined length in a corresponding direction to a circumferential direction of the lower holder 1320 to be described below.

In the lower holder 1320, a lower assembly groove 1322 may be formed to enable a lower bearing 1340 to be assembled in a lower portion of the lower holder 1320. The lower holder 1320 may be formed by protruding downward from the upper holder 1310. Herein, the lower holder 1320 is formed to have a rotation center axis (R) eccentric with respect to a central axis (C) of the pinion shaft 1130. Such eccentricity between the central axis (R) of the lower holder 1320 and the central axis (C) of the pinion shaft 1130 is directed to adjust an axial distance to the output shaft 1201 by changing a position of the pinion shaft 1130. Such a structure of changing the position of the pinion shaft 1130 will be described below again.

The upper bearing 1330 and the lower bearing 1340, which are coupled to the upper assembly groove 1312 and the lower assembly groove 1322, respectively, are coupled to the pinion shaft 1130 to support the pinion shaft 1130 to stably rotate. Accordingly, the upper assembly groove 1312 and the lower assembly groove 1322 may be formed in a row to have the same central axis as the pinion shaft 1130. In addition, the upper assembly groove 1312 and the lower assembly groove 1322 communicate with each other to make the pinion shaft 1130 penetrated. Thus, a stopper 1350 may be provided between the upper assembly groove 1312 and the lower assembly groove 1322 in order to support the upper bearing 1330 and the lower bearing 1340.

The stopper 1350 is formed to protrude radially between the upper assembly groove 1312 and the lower assembly groove 1322. Thus, the stopper 1350 supports a lower portion of the outer ring of the upper bearing 1330 installed in the upper assembly groove 1312 and an upper portion of the outer ring of the lower bearing 1340 installed in the lower assembly groove 1322 and restricts a movement.

A fixing device may fix the upper bearing 1330 and the lower bearing 1340 to the holder 1300 in order to restrict an axial movement of the pinion shaft 1130 assembled with the upper bearing 1330 and the lower bearing 1340.

The fixing device may include a wave washer 1361 disposed above the upper bearing 1330, a lock ring 1362 disposed below the lower bearing 1340 and a flange 1131 supporting the wave washer 1361. Herein, the flange 1131 may be formed to extend radially from the pinion shaft 1130. That is, when the pinion shaft 1130 is assembled with the upper bearing 1330, the flange 1131 presses the wave washer 1361 from the top to be assembled. Accordingly, by being pressed by the flange 1131, the wave washer 1361 is elastically deformed to support the inner ring of the upper bearing 1330 and absorbs tolerance. In addition, the lock ring 1362 is stacked and assembled with the pinion shaft 1130 to support the inner ring of the lower bearing 1340 from below. Accordingly, the outer rings of the upper bearing 1330 and the lower bearing 1340 have restricted downward and upward movements, respectively, due to the stopper 1350 of the holder 1300. In addition, since the inner rings of the upper bearing 1330 and the lower bearing 1340 have restricted upward and downward movements, respectively, due to the fixing device, the axial movement of the pinion shaft 1130 is restricted.

The first gear housing 1400 may cover the first reducer 1100 and may be coupled to the second gear housing 1500. The first gear housing 1400 has a first receiver (see '1410' of FIG. 11) receiving the worm 1110 and the second receiver 1420 receiving the worm wheel 1120. Herein, the first receiver 1410 and the second receiver 1420 are provided to communicate with each other so that the worm 1110 and the worm wheel 1120 are engaged with each other. In addition, since the second receiver 1420 is vertically penetrated, the second gear housing 1500 is coupled to the lower portion of the first gear housing 1400 and the sensing cover 1610 is coupled to the upper portion of the second receiver 1420 so that the worm wheel 1120 is received in the second receiver 1420.

Meanwhile, a free play adjustment groove 1430 is formed in the first gear housing 1400, and a free play adjustment protrusion 1530 is provided in the second gear housing 1500. The free play adjustment groove 1430 and the free play adjustment protrusion 1530 are free play adjustment means for adjusting a backlash between the worm 1110 and the worm wheel 1120, and a structure and method for adjusting free play will be described below again.

The second gear housing 1500 may have the first mounter 1510 in which the pinion shaft 1130 is received and mounted, and the second mounter 1520 spaced apart from the first mounter 1510 and in which the output shaft 1201 is received and mounted. As described above, the first gear housing 1400 is coupled to the second gear housing 1500.

The first mounter 1510 and the second mounter 1520 are classified according to a component installed in the second gear housing 1500, and a predetermined receiving space is provided in each of the first mounter 1510 and the second mounter 1520. In addition, the first mounter 1510 and the second mounter 1520 may be provided to communicate with each other so that the first gear 1210 of the pinion shaft 1130 provided in the first mounter 1510 and the second gear 1220 of the output shaft 1201 provided in the second mounter 1520 may be engaged with each other.

The first mounter 1510 may have a seating jaw 1531 protruding upward to form a seating groove 1532 where the lower holder 1320 is seated, and the seating groove 1532 may have a second receiving groove 1513 where the pinion shaft 1130 is inserted downward. Accordingly, the worm wheel 1120, the pinion shaft 1130, and the holder 1300 are mounted in the first mounter 1510, while constituting a single assembly.

The seating jaw 1531 is formed to protrude upward so that the seating groove 1532 is formed inward. Herein, it is preferable for an inner diameter of the seating jaw 1531 to correspond to an outer diameter of the lower holder 1320 or to be a little greater than the outer diameter of the lower holder 1320. Thus, when the lower holder 1320 is inserted into the seating groove 1532, the upper holder 1310 may be seated and supported on an upper surface of the seating jaw 1531. In addition, the pinion shaft 1130, where the first gear 1210 is formed, may be inserted into the receiving groove 1513.

Herein, since the central axis (R) of the lower holder 1320 is formed eccentrically from the central axis (C) of the pinion shaft 1130, the receiving groove 1513 may be formed eccentrically from the center of the seating groove 1532. That is, the seating groove 1532 and the receiving groove 1513 may be formed in positions corresponding to the lower holder 1320 and the pinion shaft 1130.

Meanwhile, the free play adjustment protrusions 1530 are provided in positions corresponding to the plurality of coupling pieces 1315 in order to fix the holder 1300 in the second gear housing 1500, that is, in the first mounter 1510. In the free play adjustment protrusion 1530, a fastening hole 1536 is formed to fix the holder 1300 through a bolt. In order to maintain stable engagement between the free play adjustment protrusion 1530 and the holder 1300, the free play adjustment protrusion 1530 may have a height corresponding to a height of the seating jaw 1531. In addition, the plurality of free play adjustment protrusions 1530 and the plurality of coupling pieces 1315 may be arranged to have a phase difference of at least 180 degrees, respectively.

Additionally, in the plurality of coupling pieces 1315, the coupling hole 1316 communicating with the fastening hole 1536 is formed so that a bolt is fastened to the fastening hole 1536. Herein, the coupling hole 1316 may be formed as a long hole to retain the state of communicating with the fastening hole 1536 as the position of the holder 1300 is changed when the holder 1300 rotates with respect to the rotational center axis (R) of the lower holder 1320. That is, the long hole 1316 may be formed to have a circumference corresponding to the circumferential direction of the lower holder 1320.

The plurality of free play adjustment protrusions 1530 may be provided in the first mounter 1510 of the second gear housing 1500. As illustrated, two free play adjustment protrusions 1530 may have a predetermined length, while being spaced a predetermined distance apart from each other. The free play adjustment protrusions 1530 may be provided in positions corresponding to the above-described coupling pieces 1315. In addition, in the first gear housing 1400, the free play adjustment groove 1430 for inserting the free play adjustment protrusion 1530 may be formed in a position corresponding to the free play adjustment protrusion 1530.

Specifically, the free play adjustment protrusion 1530 and the free play adjustment groove 1430 may be formed to have a predetermined length in a direction where the worm 1110 and the worm wheel 1120 face each other. In addition, a length (L1) of the free play adjustment groove 1430 may be longer than a length (L2) of the free play adjustment protrusion 1530. Thus, the first gear housing 1400 may be moved from the second gear housing 1500 through the free play adjustment groove 1430 and the free play adjustment protrusion 1530, and a backlash between the worm 1110 and the worm wheel 1120 may be adjusted according to the movement of the first gear housing 1400.

Hereinafter, an initial free play adjustment method between reducer gears of a steering actuator with such a structure will be described.

First, a method of adjusting a backlash between the first gear 1210 and the second gear 1220 will be described.

First, the output shaft 1201 is mounted in the second mounter 1520 of the second gear housing 1500, and the worm wheel 1120, the pinion shaft 1130, and the holder 1300 are arranged in the first mounter 1510, while constituting a single assembly. That is, the pinion shaft 1130 is inserted into the receiving groove 1513, and the lower holder 1320 is inserted and placed into the seating groove 1532.

Herein, since the lower holder 1320 is formed to have the rotational center axis (R) eccentric with respect to the central axis (C) of the pinion shaft 1130, the central axis (C) of the pinion shaft 1130 is changed during rotation of the lower holder 1320. For example, when the lower holder 1320 rotates clockwise around the rotational center axis (R), the pinion shaft 1130 may be moved in a direction away from the output shaft 1201, and when the lower holder 1320 rotates counterclockwise, the pinion shaft 1130 may be moved in a direction toward the output shaft 1201. That is, as illustrated in FIG. 9, a backlash between the first gear 1210 and the second gear 1220 may be adjusted by rotating the assembly of the holder 1300 around the rotational center axis (R) of the lower holder 1320.

When the backlash adjustment between the first gear 1210 and the second gear 1220 is completed, the upper holder 1310 is fixed to the first mounter 1510 by fastening a bolt to the fastening hole 1536 through the coupling piece 1315 of the upper holder 1310. Herein, as the coupling hole 1316 formed in the coupling piece 1315 is formed as a long hole, even if the coupling piece 1315 is moved in a direction of rotating together with the holder 1300, the fastening hole 1536 remains within the coupling hole 1316. Accordingly, as the bolt is fastened to the fastening hole 1536 through the coupling hole 1316, the holder 1300 may be fixed to the free play adjustment protrusion 1530.

Next, a method of adjusting a backlash between the worm 1110 and the worm wheel 1120 will be described. Herein, the backlash adjustment between the worm 1110 and the worm wheel 1120 may be performed in a state where the above-described backlash between the first gear 1210 and the second gear 1220 is adjusted. This is because the arrangement of components enables the procedure to be easily implemented.

When the assembly of the worm wheel 1120 with the adjusted backlash, the pinion shaft 1130, and the holder 1300 is fixed to the first mounter 1510, the first gear housing 1400 is seated on the second gear housing 1500. That is, the first gear housing 1400 is temporarily assembled so that the worm wheel 1120 is received in the second receiver 1420 of the first gear housing 1400. Herein, the free play adjustment protrusion 1530 of the second gear housing 1500 is inserted into the free play adjustment groove 1430 of the first gear housing 1400.

In this state, the backlash between the worm wheel 1120 and the worm 1110 is adjusted by moving the first gear housing 1400 in a direction toward the worm wheel 1120 or in a direction away from the worm wheel 1120. Herein, since the length (L1) of the free play adjustment groove 1430 is longer than the length (L2) of the free play adjustment protrusion 1530, the first gear housing 1400 is allowed to move a predetermined distance.

When the backlash adjustment between the worm 1110 and the worm wheel 1120 is completed, the first gear housing 1400 is fixed to the second gear housing 1500 through the bolt.

Accordingly, since an initial free play between the first reducer 1100 and the second reducer 1200 is adjusted in an early stage of fabricating the steering actuator 1000 and then a complete product is provided, not only the product quality may be improved, but also problems such as noise caused by poor tooth engagement between gears and unstable power transmission may be prevented in advance.

A steering actuator according to an embodiment of the present disclosure can not only provide a significant reduction ratio by having a two-stage reduction structure but also be applied to and used in a small car.

In addition, an initial free play adjustment method between reducer gears of a steering actuator according to an embodiment of the present disclosure can easily control a backlash between the reducer gears of the steering actuator. Accordingly, stable steering drive can be provided, while preventing occurrence of noise due to tooth disengagement between the gears.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. A steering actuator comprising:

a first reducer including a worm configured to rotate by receiving a rotational force of a motor and a worm wheel configured to rotate in engagement with the worm;

a pinion shaft coupled to a center of the worm wheel and configured to rotate together with the worm wheel;

a second reducer including a first gear formed on the pinion shaft, and an output shaft configured to operate a pitman arm while rotating by receiving a rotational force through a second gear engaged with the first gear;

a first gear housing configured to receive the worm and coupled to the motor;

a second gear housing provided with a first mounter for receiving and mounting the pinion shaft and a second mounter formed apart to communicate with the first mounter and configured to receive and mount the output shaft, and coupled to the first gear housing; and a holder configured to rotatably support the pinion shaft and having a rotational center axis eccentric with respect to a central axis of the pinion shaft to adjust an axial distance between the pinion shaft and the output shaft, wherein the first mounter of the second gear housing has free play adjustment protrusions that are spaced a predetermined distance apart from each other and have a predetermined length, the first gear housing has a free play adjustment groove, into which each of the free play adjustment protrusions is inserted, in a position corresponding to each of the free play adjustment protrusions, and the free play adjustment groove has a greater length than the free play adjustment protrusion.

2. The steering actuator of claim 1, wherein the holder further comprises an upper bearing coupled to the pinion shaft and assembled at an upper side of the holder and a lower bearing coupled to the pinion shaft and assembled at a lower side of the holder.

3. The steering actuator of claim 2, further comprising a fixing device configured to restrict an axial movement of the pinion shaft and fix the upper bearing and the lower bearing to the holder.

4. The steering actuator of claim 3, wherein the fixing device comprises:

a wave washer disposed above the upper bearing;

a lock ring disposed below the lower bearing and stacking-assembled with the pinion shaft to support an inner ring of the lower bearing; and a flange formed to extend from the pinion shaft in a radial direction and configured to apply a pressure to support an inner ring of the upper bearing through the wave washer.

5. The steering actuator of claim 4, wherein the wave washer is elastically deformed by being pressed by the flange and absorbs tolerance.

6. The steering actuator of claim 2, wherein the holder comprises an upper holder having an upper assembly groove in which the upper bearing is assembled and a lower holder having a lower assembly groove in which the lower bearing is assembled, and the upper assembly groove and the lower assembly groove are formed in a row so as to have the same central axis as the pinion shaft.

7. The steering actuator of claim 6, wherein a stopper configured to support an outer ring of the upper bearing and an outer ring of the lower bearing is provided between the upper assembly groove and the lower assembly groove.

8. The steering actuator of claim 6, wherein the lower holder is formed to have a central axis eccentric with respect to the central axis of the pinion shaft so that a position of the central axis of the pinion shaft is changed according to rotation of the lower holder.

9. The steering actuator of claim 6, wherein the first mounter has a seating jaw protruding upward to form a seating groove where the lower holder is seated, and the upper holder is seated on an upper surface of the seating jaw and supported.

10. The steering actuator of claim 9, wherein a plurality of coupling pieces, which are spaced a predetermined distance apart and protrude in a radial direction are provided at an edge of the upper holder, and the second gear housing is provided with a free play adjustment protrusion with a fastening hole formed in a position corresponding to each of the plurality of coupling pieces.

11. The steering actuator of claim 10, wherein, in the plurality of coupling pieces, a coupling hole is formed so that a bolt passes through to be fastened to the fastening hole, and the coupling hole is provided as a long hole having a predetermined length in a direction corresponding to a circumferential direction of the lower holder.

12. The steering actuator of claim 11, wherein the upper holder is bolted to the free play adjustment protrusion through the long hole and the fastening hole after a backlash between the first gear of the pinion shaft and the second gear of the output shaft is adjusted.

13. The steering actuator of claim 1, wherein the free play adjustment protrusion and the free play adjustment groove are formed to have a predetermined length in a direction where the worm and the worm wheel face each other, and the first gear housing is moved through the free play adjustment groove and the free play adjustment protrusion and fixed to the second gear housing by a bolt after backlash adjustment between the worm and the worm wheel.

14. The steering actuator of claim 1, further comprising a fixing member configured to fix the output shaft to the second mounter.

15. The steering actuator of claim 14, wherein the fixing member comprises:

a first fixer assembled with an upper portion of the output shaft with respect to the second gear and rotatably supporting the output shaft; and a second fixer assembled with a lower portion of the output shaft with respect to the second gear and rotatably supporting the output shaft.

16. The steering actuator of claim 15, wherein the first fixer comprises:

a needle bearing coupled to an upper end of the output shaft; and a bearing cover having the needle bearing installed at a center and press-fitted to the second mounter.

17. The steering actuator of claim 15, wherein the second fixer comprises:

a fixed bearing having an inner ring supported on a stepped portion of the output shaft and an outer ring supported on a mounting hole of the second gear housing;

a lock nut screwed to the output shaft to support the inner ring of the fixed bearing;

a plug having an inner side receiving the lock nut and an outer side screwed to the mounting hole of the second gear housing; and a dust seal interposed between the inner side of the plug and the output shaft.

18. An initial free play adjustment method between reducer gears of a steering actuator, wherein the steering actuator comprises:

a first gear housing configured to receive a worm and cover a worm wheel engaged with the worm;

a second gear housing in which the worm wheel is disposed and mounted;

a plurality of free play adjustment protrusions provided in the second gear housing to be located radially outside the worm wheel; and a free play adjustment groove provided in the first gear housing at a position corresponding to each of the free play adjustment protrusions so that each of the free play adjustment protrusions is inserted, the free play adjustment groove and the free play adjustment protrusion have a predetermined length in a direction where the worm and the worm wheel face each other, and the free play adjustment groove has a greater length than the free play adjustment protrusion, and the steering actuator adjusts a backlash between the worm and the worm wheel by moving the first gear housing in a longitudinal direction of the free play adjustment protrusion and the free play adjustment groove.

* * * * *